(12) United States Patent
Faye et al.

(10) Patent No.: US 12,489,263 B2
(45) Date of Patent: Dec. 2, 2025

(54) TRACK ASSEMBLY

(71) Applicant: Lear Corporation, Southfield, MI (US)

(72) Inventors: Patrick Faye, Roche-la-Molière (FR); Julien Iecker, Roche-la-Molière (FR)

(73) Assignee: Lear Corporation, Southfield, MI (US)

( * ) Notice: Subject to any disclaimer, the term of this patent is extended or adjusted under 35 U.S.C. 154(b) by 182 days.

(21) Appl. No.: 18/532,751

(22) Filed: Dec. 7, 2023

(65) Prior Publication Data
US 2025/0192500 A1    Jun. 12, 2025

(51) Int. Cl.
| | | |
|---|---|---|
| B60N 2/00 | (2006.01) | |
| B60N 2/07 | (2006.01) | |
| B60N 2/90 | (2018.01) | |
| H01R 35/02 | (2006.01) | |
| H01R 43/26 | (2006.01) | |

(52) U.S. Cl.
CPC ......... H01R 35/025 (2013.01); B60N 2/0722 (2013.01); B60N 2/90 (2018.02); H01R 43/26 (2013.01)

(58) Field of Classification Search
None
See application file for complete search history.

(56) References Cited

U.S. PATENT DOCUMENTS

| | | | | |
|---|---|---|---|---|
| 6,959,900 | B2* | 11/2005 | Hoshihara | B60N 2/02246 248/424 |
| 7,658,429 | B2* | 2/2010 | Koga | B60N 2/067 296/65.15 |
| 8,256,822 | B2* | 9/2012 | Koga | B60N 2/067 74/416 |
| 9,393,881 | B2 | 7/2016 | Joern | |
| 10,252,651 | B2 | 4/2019 | Bhatia | |
| 10,950,977 | B2 | 3/2021 | Ricart | |
| 11,007,905 | B2 | 5/2021 | Sonar | |
| 11,299,075 | B2* | 4/2022 | Jones | H02B 1/20 |
| 11,772,519 | B2* | 10/2023 | Kondrad | B60N 2/22 296/64 |
| 11,904,732 | B2* | 2/2024 | Kondrad | B60N 2/995 |
| 2004/0075324 | A1 | 4/2004 | Rausch | |
| 2004/0222348 | A1* | 11/2004 | Yokota | B60N 2/067 248/429 |
| 2010/0102610 | A1* | 4/2010 | Shao | B60N 2/12 297/341 |
| 2019/0337414 | A1* | 11/2019 | Condamin | B60N 2/54 |
| 2020/0189511 | A1* | 6/2020 | Ricart | B60R 16/027 |
| 2021/0129778 | A1* | 5/2021 | Fernández Bañares | B60N 2/01541 |
| 2021/0262173 | A1* | 8/2021 | Moulin | H01R 13/187 |
| 2023/0391230 | A1* | 12/2023 | Zhao | B60N 2/067 |

* cited by examiner

*Primary Examiner* — Steven M Marsh
(74) *Attorney, Agent, or Firm* — McGarry Bair PC

(57) ABSTRACT

A track assembly, comprising a track, a track electrical connector movably connected to the track, and a support assembly slidably connected to the track. The support assembly includes a support assembly electrical connector connectable with the track electrical connector, a latch selectively engageable with the track electrical connector, and an actuator including at least one of a lever, an actuator cable, or a handle. The actuator is operably coupled with the latch to selectively disengage the latch from the track electrical connector. The track electrical connector is movable with the support assembly and relative to the support assembly.

20 Claims, 17 Drawing Sheets

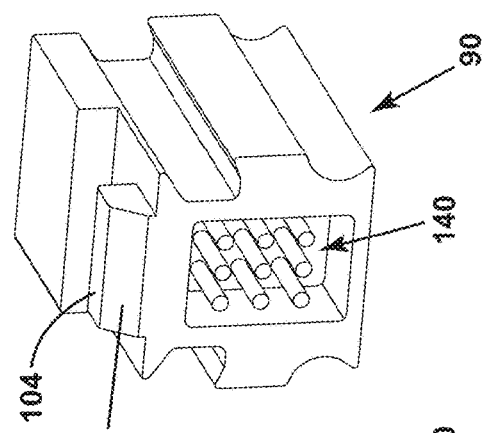
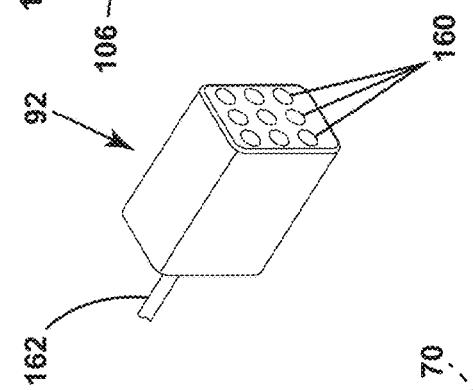
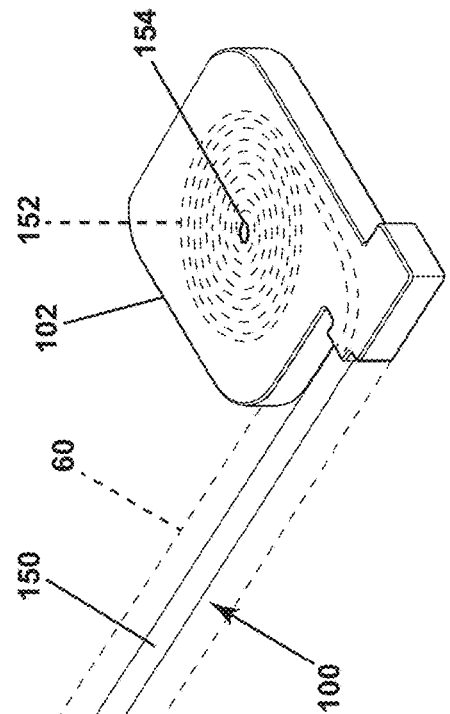
FIG. 5A
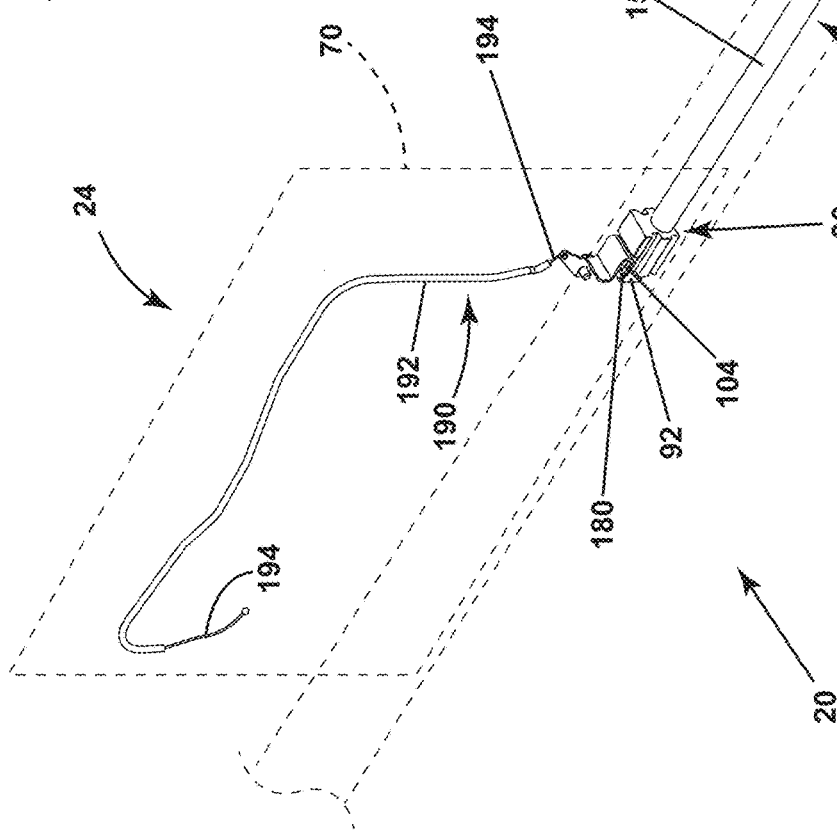
FIG. 5B

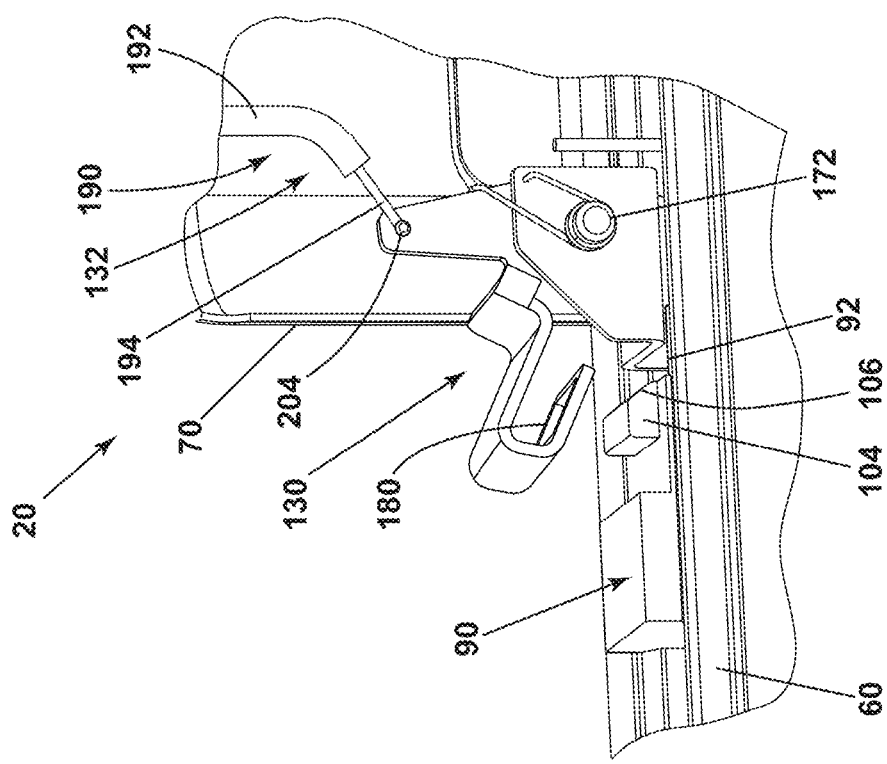
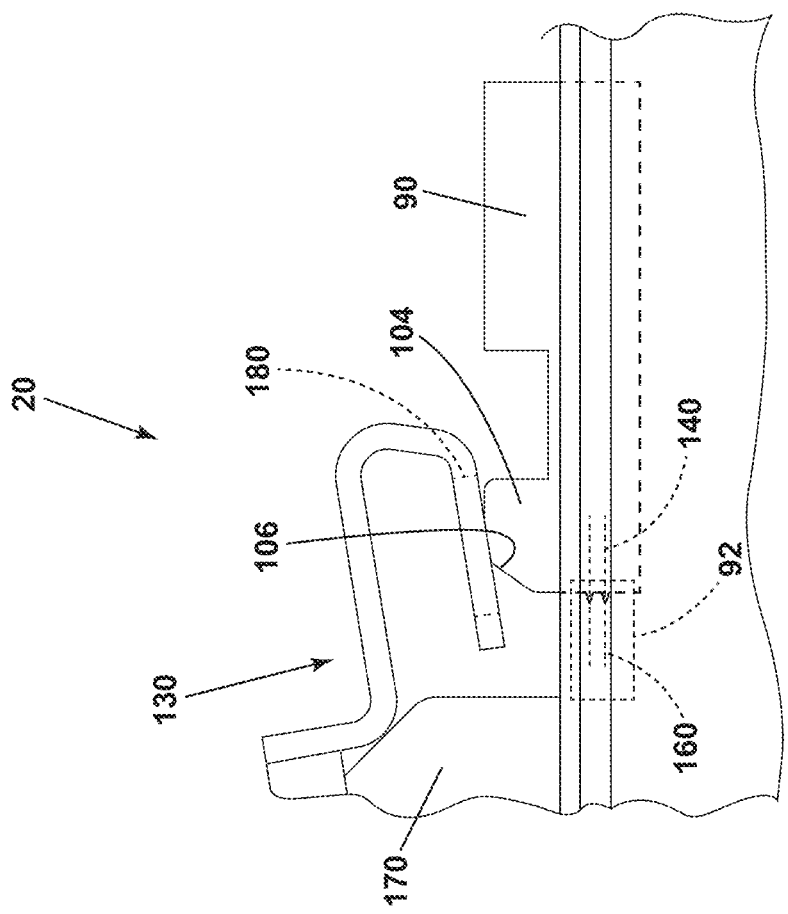

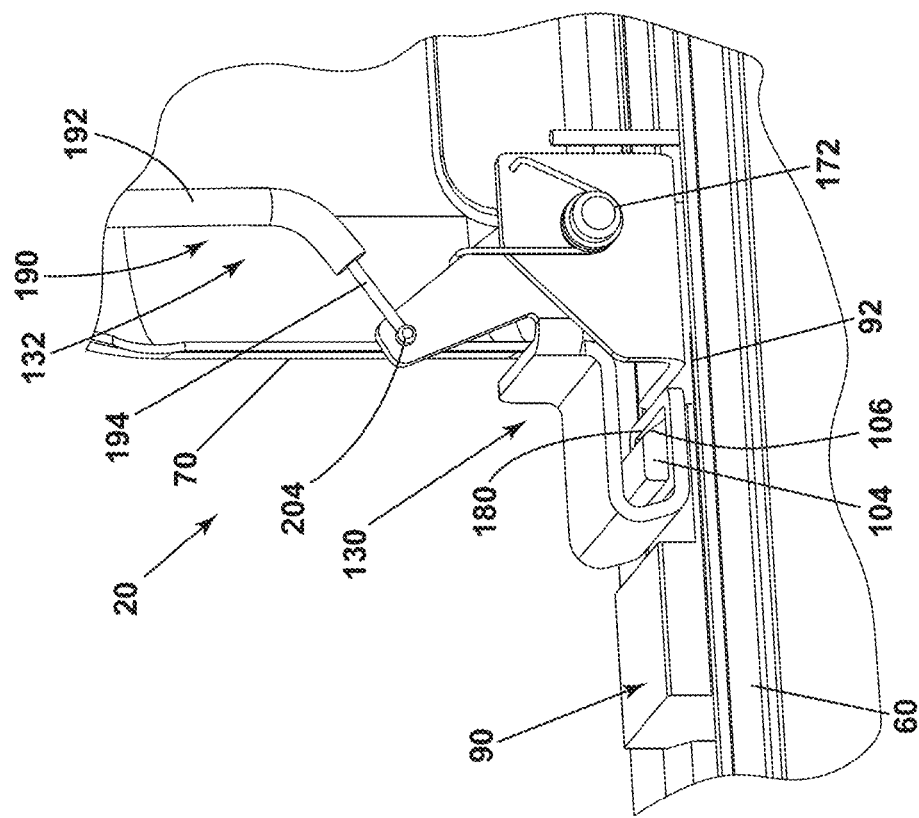
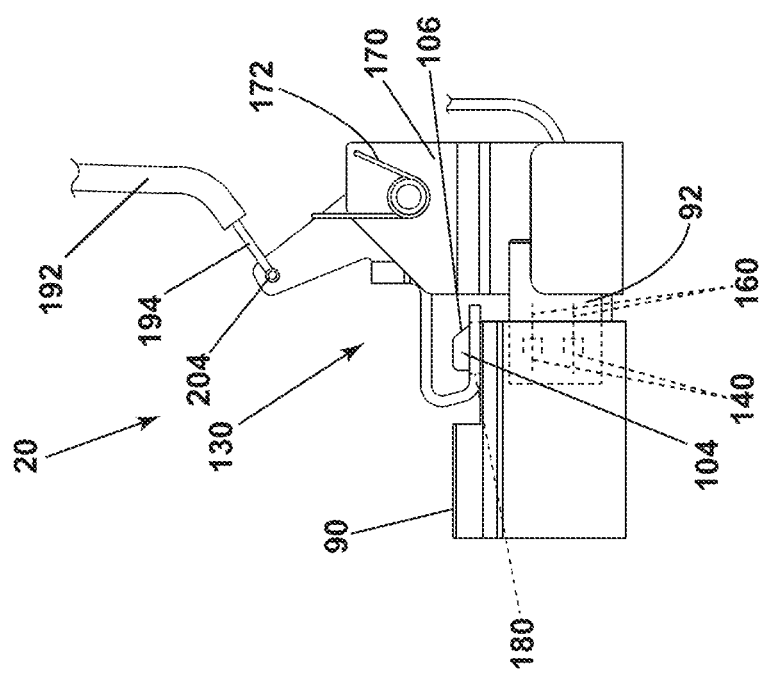

TRACK ASSEMBLY

TECHNICAL FIELD

The present disclosure generally relates to track assemblies, including track assemblies that can, for example, be utilized in connection with vehicle seats.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

FIG. 5A is a perspective view generally illustrating embodiments of a track electrical connector and a support assembly electrical connector of a track assembly according to teachings of the present disclosure.

FIG. 5B is a perspective view generally illustrating portions of an embodiment of a track assembly according to teachings of the present disclosure.

FIG. 10A is a side view generally illustrating portions of an embodiment of a track assembly, with a latch in a retracted position, according to teachings of the present disclosure.

FIG. 10B is a perspective view generally illustrating portions of an embodiment of a track assembly, with a latch in a retracted position, according to teachings of the present disclosure.

FIG. 12A is a side view generally illustrating portions of an embodiment of a track assembly, with a latch in an engaged position, according to teachings of the present disclosure.

FIG. 12B is a perspective view generally illustrating portions of an embodiment of a track assembly, with a latch in an engaged position, according to teachings of the present disclosure.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
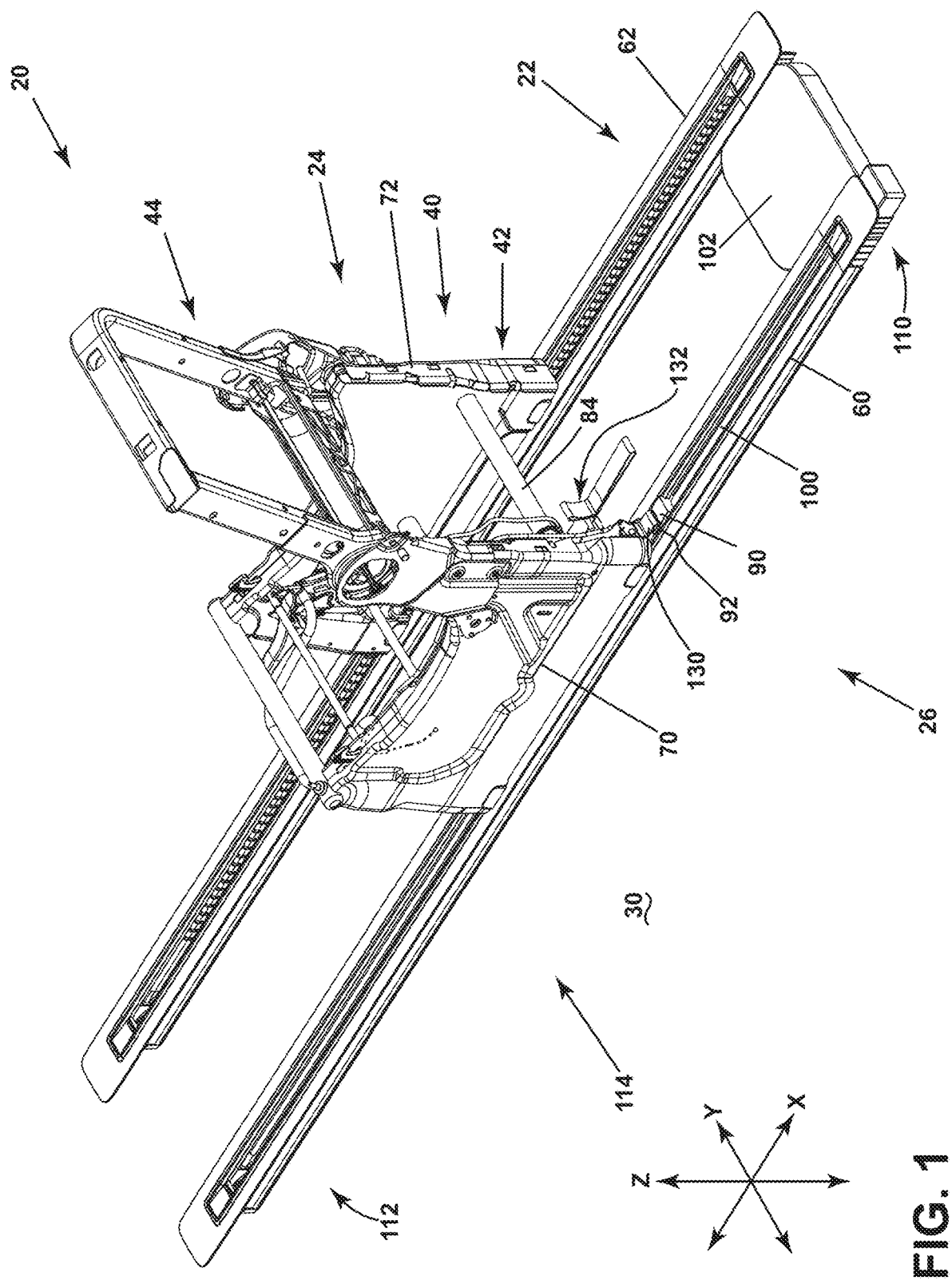
FIG. 1 is a perspective view generally illustrating an embodiment of a track assembly according to teachings of the present disclosure.

Referring to FIG. 1, a track assembly 20 is illustrated with a pair of tracks 22 and a support assembly 24. The pair of tracks 22 is coupled with a mounting surface 30, which can include a vehicle surface, such as a vehicle floor, among other surfaces. The support assembly 24 is movably (e.g., slidably) connected with the mounting surface 30 via the pair of tracks 22. The support assembly 24 includes a support body 40 having a pair of base portions 42. The pair of base portions 42 are movably (e.g., slidably) connected to the pair of tracks 22, such as to slidably connect the support assembly 24 with the pair of tracks 22. A component 44, such as a seat, a console, or a storage rack, among others, can be connected to and at least partially supported by the support body 40. Optionally, the track assembly 20 is included with a vehicle 26. The pair of tracks 22 includes a first track 60 spaced from a second track 62, such as in a transverse direction Y. The pair of base portions 42 includes a first base portion 70 movably connected to the first track 60 and includes a second base portion 72 movably connected to the second track 62. Optionally, a set of cross members 84 are connected to the first and second base portions 70, 72.

The track assembly 20 includes a track electrical connector 90 and a support assembly electrical connector 92 that is connectable with the track electrical connector 90. The support assembly electrical connector 92 is coupled to move with the support assembly 24 along the first track 60. The track electrical connector 90 is movable with the support assembly 24, such as when connected to the support assembly electrical connector 92, and movable relative to the support assembly 24, such as when not connected to the support assembly electrical connector 92. At least a portion of the track electrical connector 90 and at least a portion of the support assembly electrical connector 92 are configured to move (e.g., slide) within the first track 60.

The track electrical connector 90 is connected to an electrical cable 100. The electrical cable 100 is connected to and at least partially disposed in a cable winder 102. The cable winder 102 is connected to a longitudinal end 110 of the first track 60 and biases the track electrical connector 90 toward the longitudinal end 110. The first track 60 includes a second longitudinal end 112 and a middle section 114 between the ends 110, 112. In some examples, the first track 60 can be at least two meters long, but the first track 60 can include other lengths, such as equal to or between one half meter and 2.5 meters. The electrical cable 100 can, for example, include one or more insulated electrical conductors.

The support assembly 24 includes a latch 130 and an actuator 132. The latch 130 is selectively engageable with the track electrical connector 90, such as to selectively latch/lock the track electrical connector 90 with the support assembly electrical connector 92. The actuator 132 is operably coupled with the latch 130 to selectively disengage the latch 130 from the track electrical connector 90 and allow for disconnection of the track electrical connector 90 from the support assembly electrical connector 92. The cable winder 102 can apply a sufficient biasing force to the electrical cable 100 and the track electrical connector 90 such that when the actuator 132 disengages the latch 130 from the track electrical connector 90, the track electrical connector 92 is automatically disconnected from the support assembly electrical connector 92 and returned to the longitudinal end 110 of the first track 60.

Figure 2:
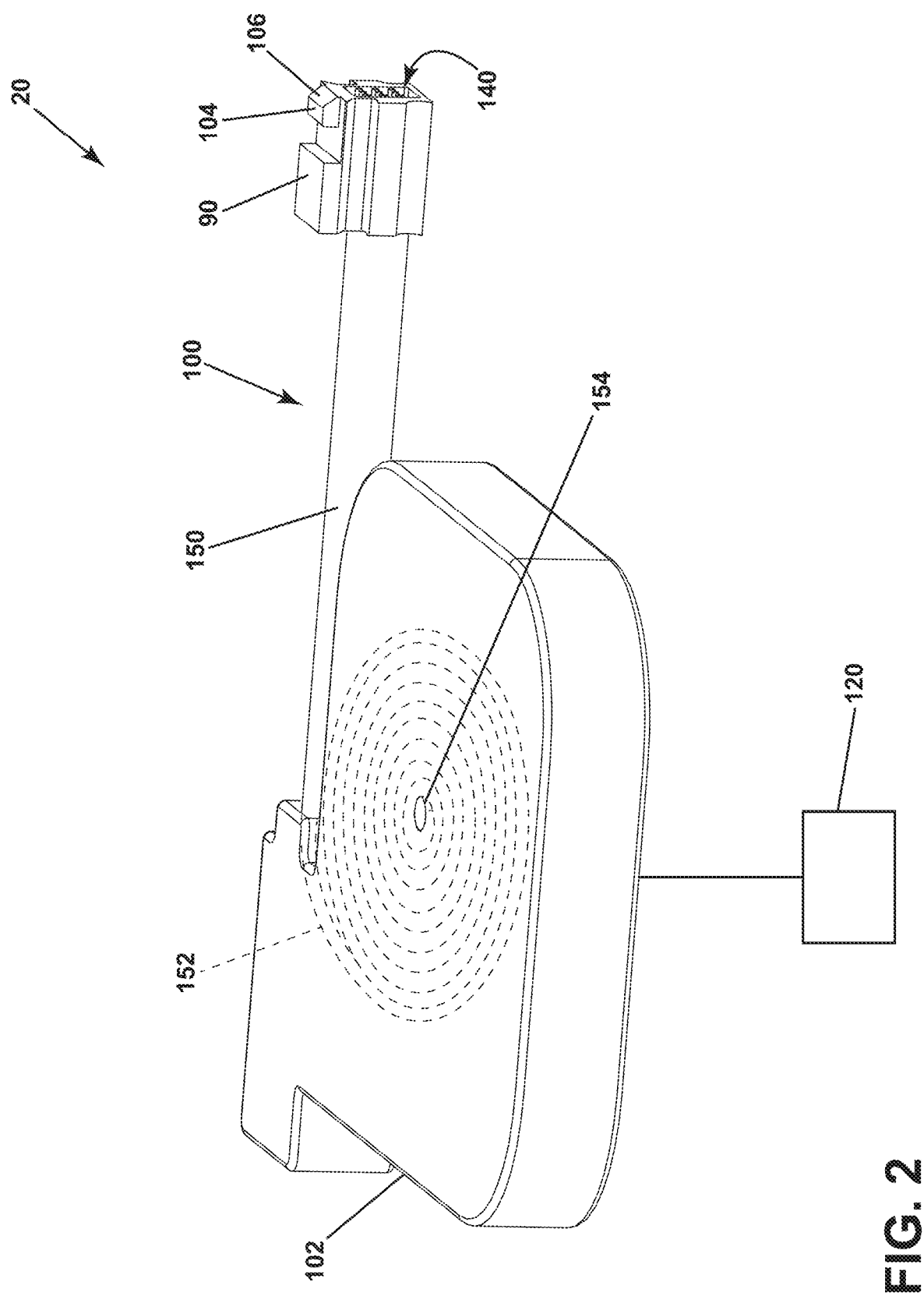
FIG. 2 is a perspective view generally illustrating portions of an embodiment of a track assembly according to teachings of the present disclosure.

Referring to FIG. 2, the track electrical connector 90, the electrical cable 100, and the cable winder 102 are illustrated. The track electrical connector 90 includes a plurality of terminals 140. The plurality of terminals 140 can, for example, a number of terminals equal to or between 2 and 10, but can include other numbers of terminals. A first portion 150 of the electrical cable 100 is disposed outside the cable winder 102 and a second portion 152 of the electrical cable 100 is disposed inside the cable winder 102. The second portion 152 can be wound within the cable winder 102, at least in the retracted position illustrated in FIG. 2. A winder spring 154 is connected to and/or disposed in the cable winder 102 to bias (e.g., rotationally) the cable winder 102 and/or the electrical cable 100 toward the retracted position. In the retracted position, the track electrical connector 90 is disposed at the longitudinal end 110 of the first track 60 (see FIG. 1). The electrical cable 100 can be connected, at least indirectly, to one or more electrical components 120, which can, for example, include circuit boards, relays, fuses, motors, power sources/storage devices, heaters, fans, or lights, among others. With vehicle applications, the one or more electrical components 120 can include a vehicle battery, an electronic control unit (ECU), and/or other vehicle components.

The track electrical connector 90 includes a protrusion 104 that extends outward to engage the latch 130. The protrusion 104 includes a ramped surface 106 to contact and guide the latch 130 (FIG. 1) onto the protrusion 104. The protrusion 104 extends from the top of the electrical connector 90 but can extend from other locations.

Figure 3:
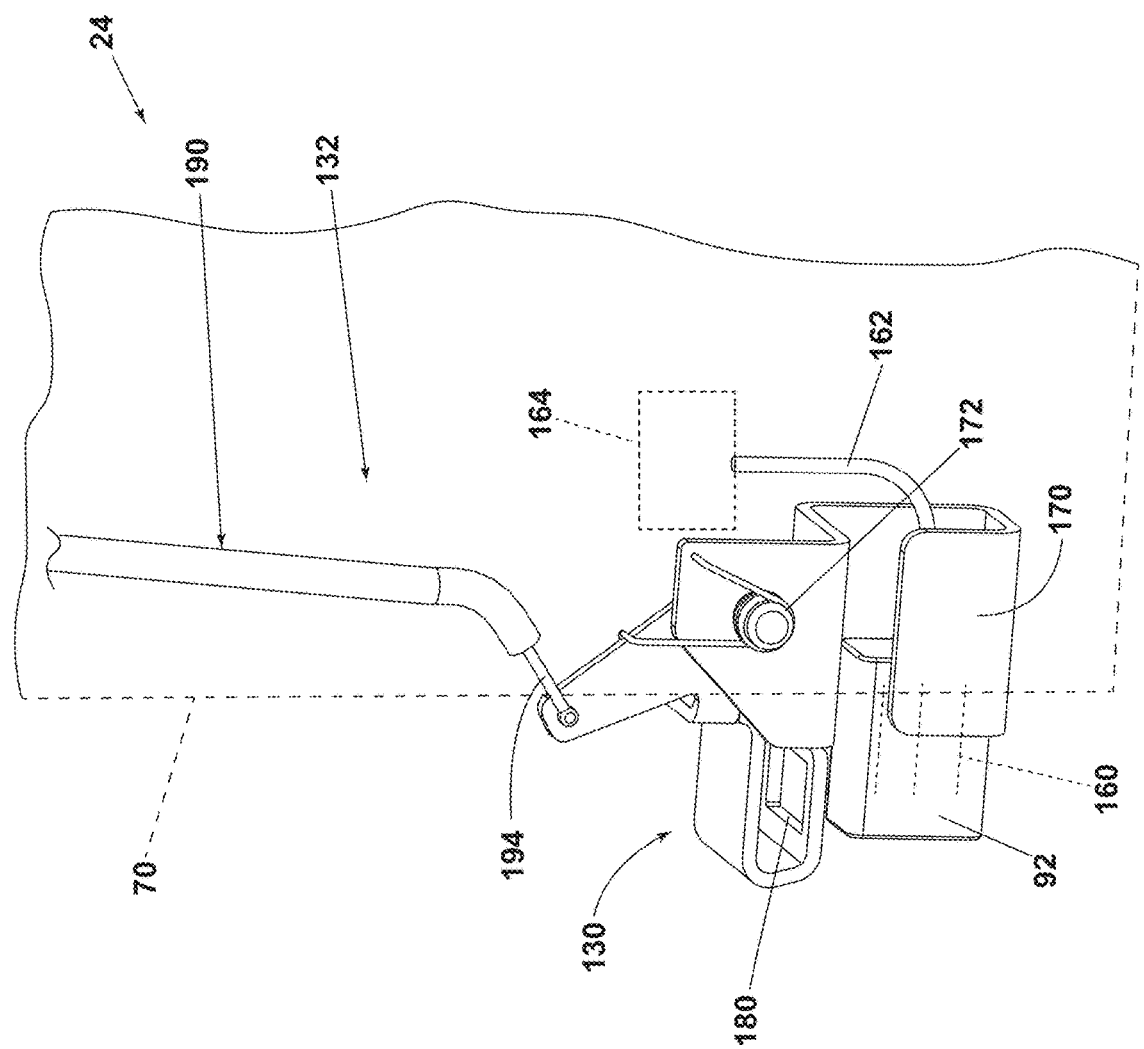
FIG. 3 is a perspective view generally illustrating portions of an embodiment of a track assembly according to teachings of the present disclosure.

Referring to FIG. 3, the support assembly electrical connector 92, the latch 130, and the actuator 132 are illustrated. The support assembly electrical connector 92 includes a plurality of terminals 160 that correspond to the plurality of terminals 140 of the track electrical connector 90. For example, the plurality of terminals 160 can include a terminal for each of the plurality of terminals 140, one or more of the plurality of terminals 160 can be configured to receive portions of the plurality of terminals 140, and/or one or more of the plurality of terminals 140 can be configured to receive portions of the plurality of terminals 160. The plurality of terminals 160 are connected to a support assembly electrical cable 162 that electrically connects the plurality of terminals 160 with one or more electrical components 164. The electrical components 164 can, for example, include circuit boards, relays, fuses, motors, power sources/storage devices, heaters, fans, or lights, among others.

Figure 4:
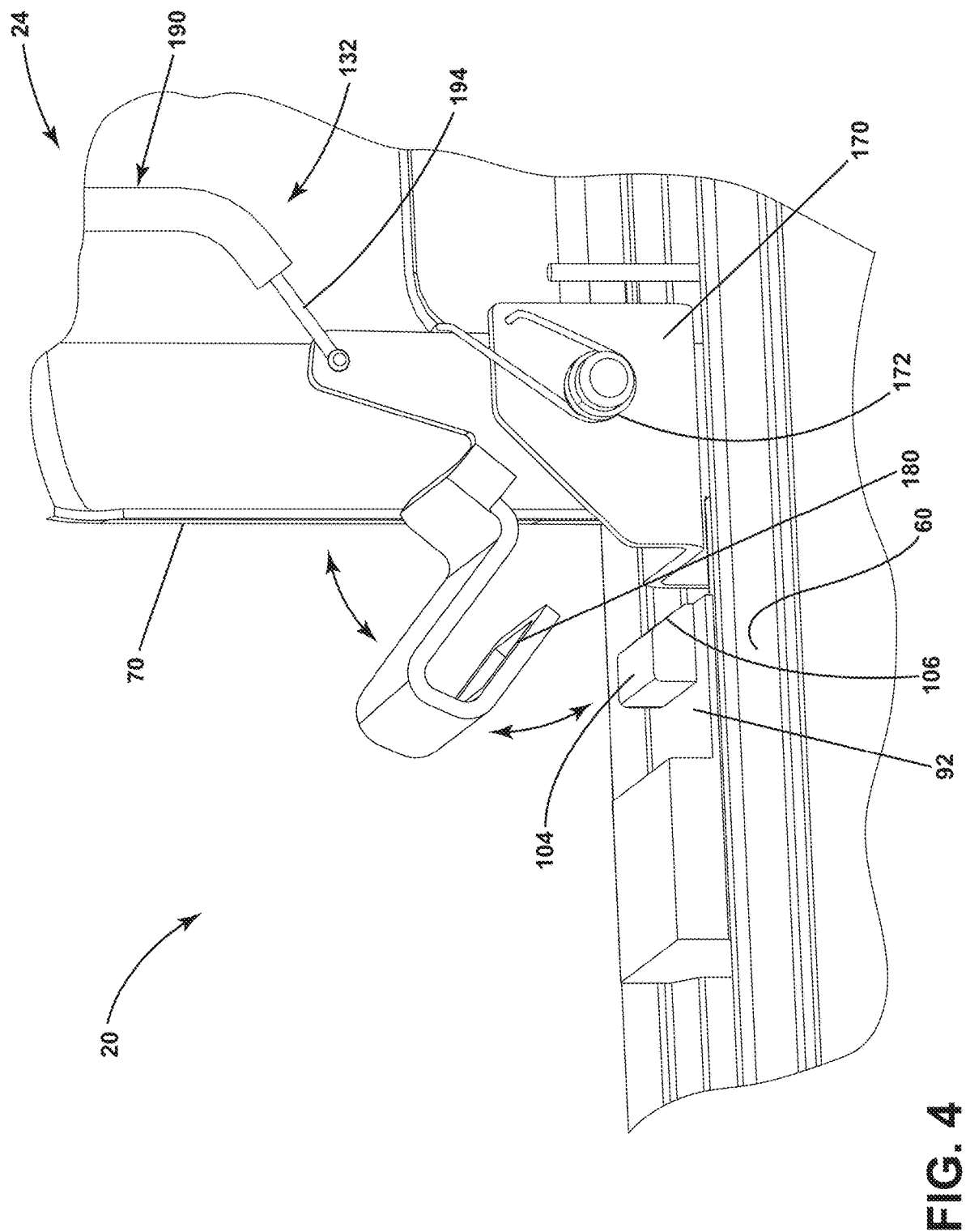
FIG. 4 is a perspective view generally illustrating portions of an embodiment of a track assembly, with a latch in a retracted position, according to teachings of the present disclosure.

The support assembly electrical connector 92 is connected to support assembly 24, such as to the first base portion 70, via a bracket 170. Optionally, the bracket 170 rigidly fixes the electrical connector 92 with the first base portion 70. The latch 130 is movably (e.g., rotatably) connected to the bracket 170 such that the latch 130 can move between an engaged position (FIG. 3) and a retracted/disengaged position (FIG. 4). A latch spring 172 biases the latch 130 toward the engaged position (e.g., generally clockwise in FIGS. 3 and 4). The latch spring 172 can, for example, include a torsion spring engaged with the latch 130 and the bracket 170.

Referring to FIGS. 3 and 4, the latch 130 includes a receptacle 180 that at least partially receives the protrusion 104 (FIG. 2) of the track electrical connector 90 (FIG. 2). The receptacle 180 can include a recess or an aperture, among other configurations.

While illustrated with the latch 130 including the receptacle 180 and the track electrical connector 90 including the protrusion 104, the opposite configuration can also be utilized with the latch 130 including the protrusion 104 and the track electrical including the receptacle 180. For example, the latch 130 or the track electrical connector 90 includes the protrusion 104 and the other of the latch 130 or the track electrical connector 90 includes the receptacle 180 to at least partially receive the protrusion 104 to lock the track electrical connector 90 with the support assembly electrical connector 92.

The actuator 132 includes an actuator cable 190 connected to the latch 130. The actuator cable 190 can include a sleeve 192 and a core 194 extending through and movable within the sleeve 192. For example, the actuator cable 190 can include a Bowden cable. The actuator cable 190 (e.g., the core 194) is connected to the latch 130 such that actuation of the actuator cable 190 with a force exceeding the spring force of the latch spring 172 causes rotation of the latch 130 toward the retracted position.

Referring to FIG. 5A, a perspective view illustrates the track electrical connector 90 and the support assembly electrical connector 92. The track electrical connector 90 is configured to receive a portion of the support assembly electrical connector 92 such that the plurality of terminals 140 of the track electrical connector 90 are inserted into the plurality of terminals 160 of the support assembly electrical connector 92.

Referring to FIG. 5B, the track electrical connector 90 is engaged and electrically connected with the support assembly electrical connector 92. The protrusion 104 is disposed at least partially in the receptacle 180 such that the track electrical connector 90 is latched/locked with the support assembly electrical connector 92. The support assembly 24 is positioned in the middle section 114 of the first track 60, and the electrical cable 100 is at least partially unwound from the cable winder 102 such that at least some of the first portion 150 is disposed in the middle section 114 of the first track 60.

Figure 6:
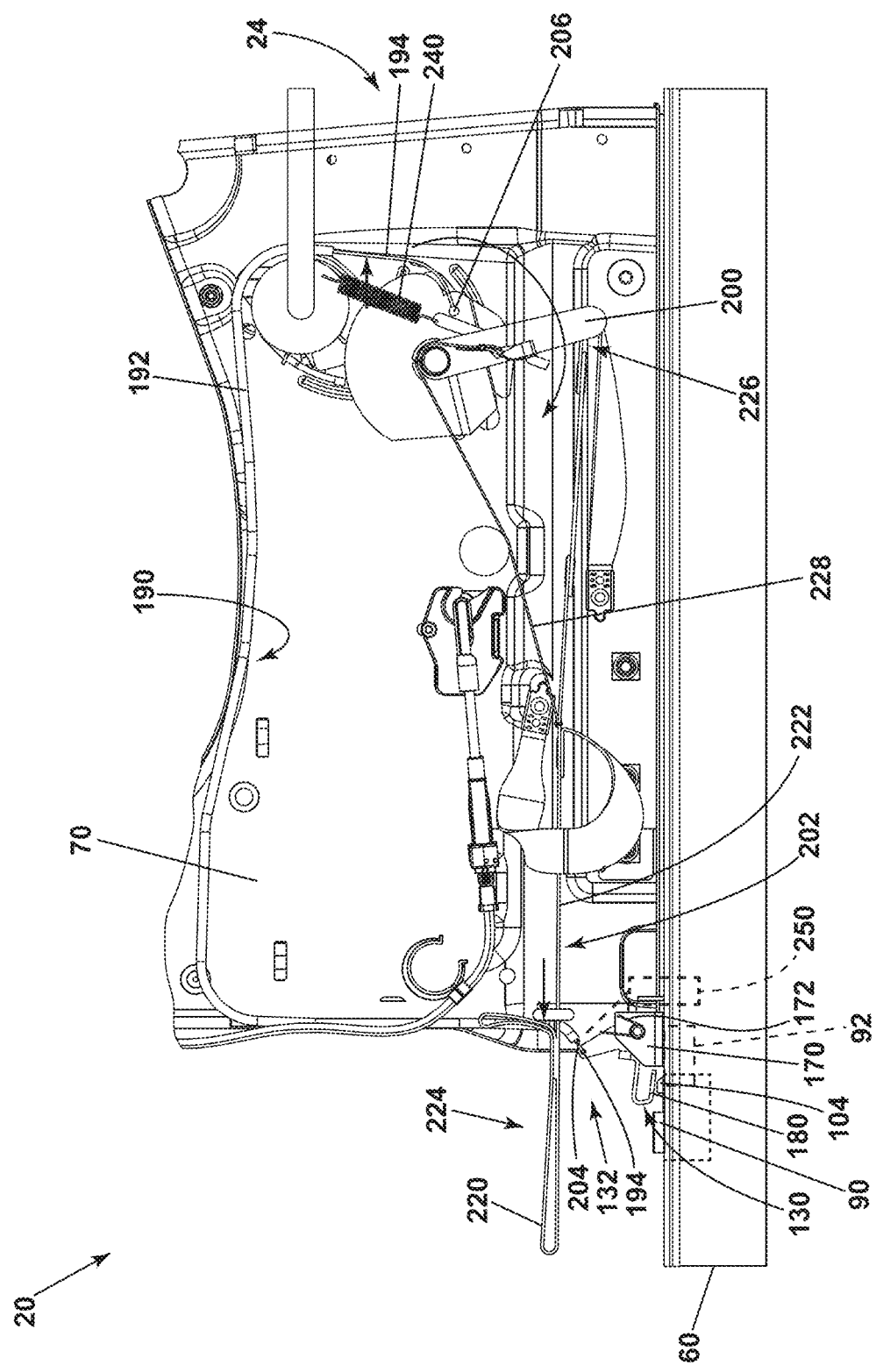
FIG. 6 is a side view generally illustrating portions of an embodiment of a track assembly according to teachings of the present disclosure.

Referring to FIG. 6, the actuator 132 includes the actuator cable 190, a lever 200, and a handle 202. The lever 200 is rotatably coupled with the first base portion 70. The core 194 of the actuator cable 190 is connected to the lever 200 such that rotation of the lever 200 causes movement of the core 194 in the sleeve 192, such as to disengage the latch 130. For example, a first end 204 of the actuator cable 190 is connected to the latch 130, and a second end 206 of the actuator cable 190 is connected to the lever 200. The handle 202 includes a handle portion 220 and a connecting portion 222. The handle 202 can be configured as a strap such that the handle portion 220 comprises a loop of the strap. The handle portion 220 is disposed at a first end 224 of the connecting portion 222. A second end 226 of the connecting portion 222 is connected to the lever 200 such that actuation (e.g., pulling) of the handle portion 220 causes rotation of the lever 200 (e.g., clockwise in FIG. 6). The actuator 132 can include a lever spring 240 that biases the handle 202 in the direction opposite of actuation (e.g., counterclockwise in FIG. 6). When a force exceeding the spring force of the latch spring 172 and/or the lever spring 240 pulls on the handle 202, the lever 200 rotates, pulling on the core 194, which rotates the latch 130 to disengage the latch 130. While illustrated as a combination of the actuator cable 190, the lever 200, and the handle 202, the actuator 132 can include other configurations, such as configurations with the only one or two of the actuator cable 190, the lever 200, or the handle 202 (e.g., directly connected to the latch 130), or other configurations. The handle 202 can include a resilient portion 228 connected to the connecting portion 222 and the lever 200 and/or the first base portion 70. The resilient portion 228 may help maintain tension in the connecting portion 222, such as to limit or prevent sagging.

The support assembly 24 can include an anchor 250 that is movably connected to first base portion 70 to selectively engage the first track 60 and restrict removal of the support assembly 24 from the first track 60. The actuator 132 can be operably coupled with the anchor 250 such that operation of the actuator moves the anchor to a disengaged/removal position and disengages the latch from the track electrical connector 90. In some configurations, the actuator cable 190 is connected to move the anchor 250. In other configurations, the anchor 250 is operably coupled with the lever 200 and/or the handle 202. Movement of the anchor 250 between engaged and disengaged/removal positions can include rotation about the vertical axis Z and/or about the longitudinal axis X, among other types of movement.

Figure 7:
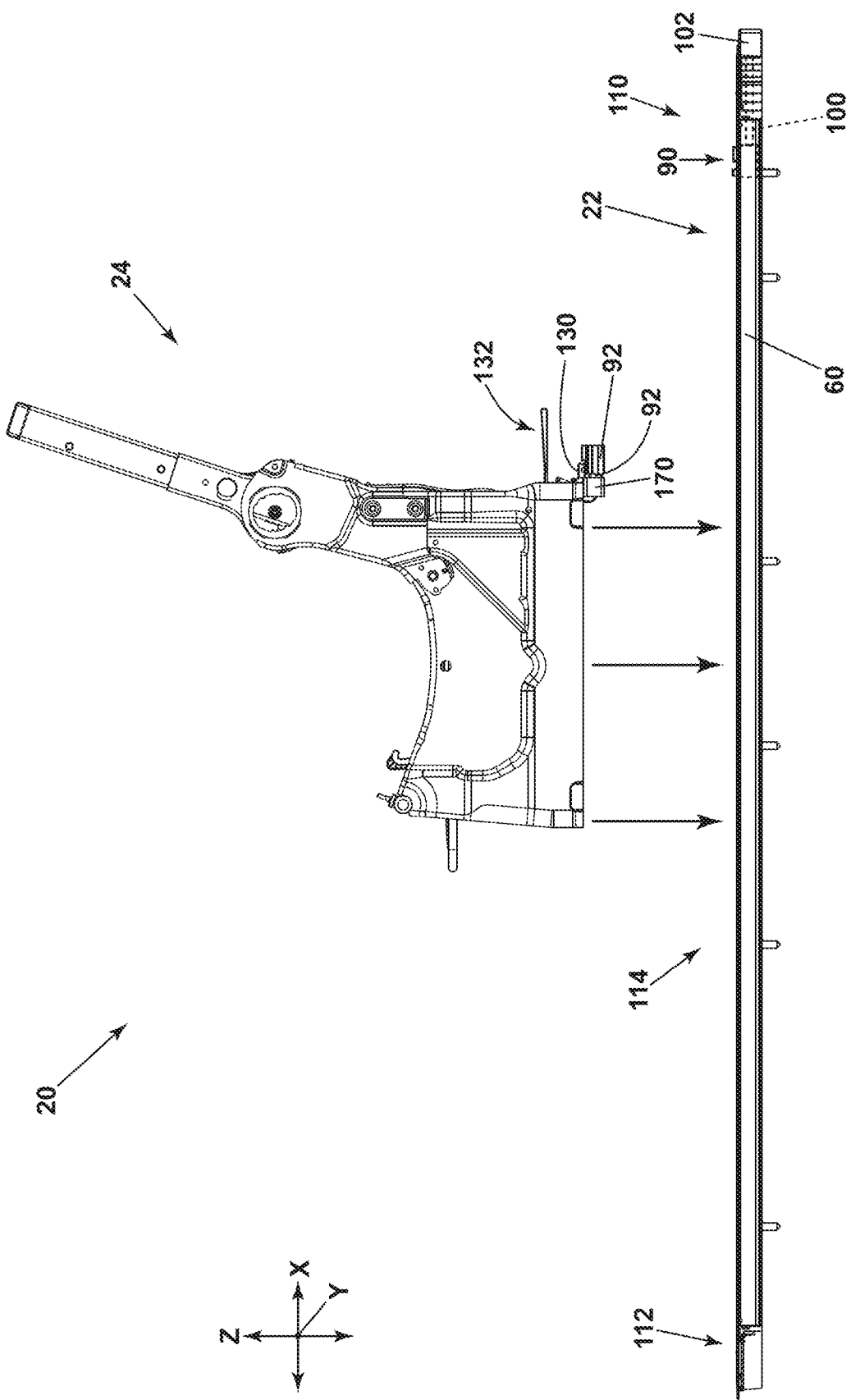
FIG. 7 is a side view generally illustrating an embodiment of a track assembly, with a support assembly disconnected from a track, according to teachings of the present disclosure.
Figure 8:
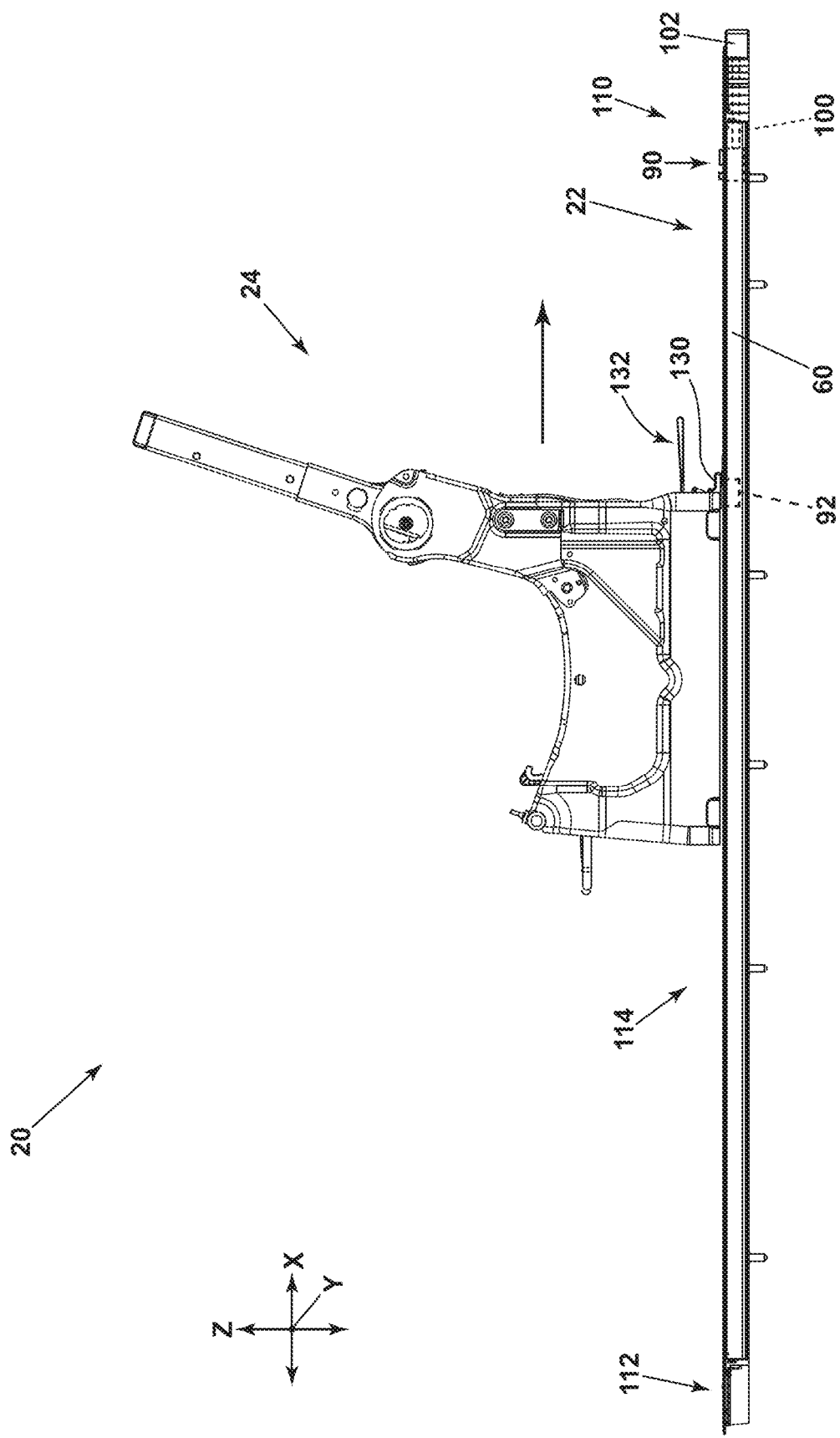
FIG. 8 is a side view generally illustrating an embodiment of a track assembly, with a support assembly connected with a track, according to teachings of the present disclosure.

FIGS. 7-16 generally illustrate a method of operating the track assembly 20. Referring to FIG. 7, the support assembly 24 is shown disconnected and separate from the pair of tracks 22. The support assembly 24 may have been previously removed (e.g., vertically) from the pair of tracks 22 or may not have been previously connected to the pair of tracks 22. The support assembly 24 can be moved toward the pair of tracks 22, such as downward in the vertical direction Z, to the connected position shown in FIG. 8. Once in the connected position, the support assembly 24 can move (e.g., slide) along the first track 60 toward the longitudinal end 110.

Figure 9:
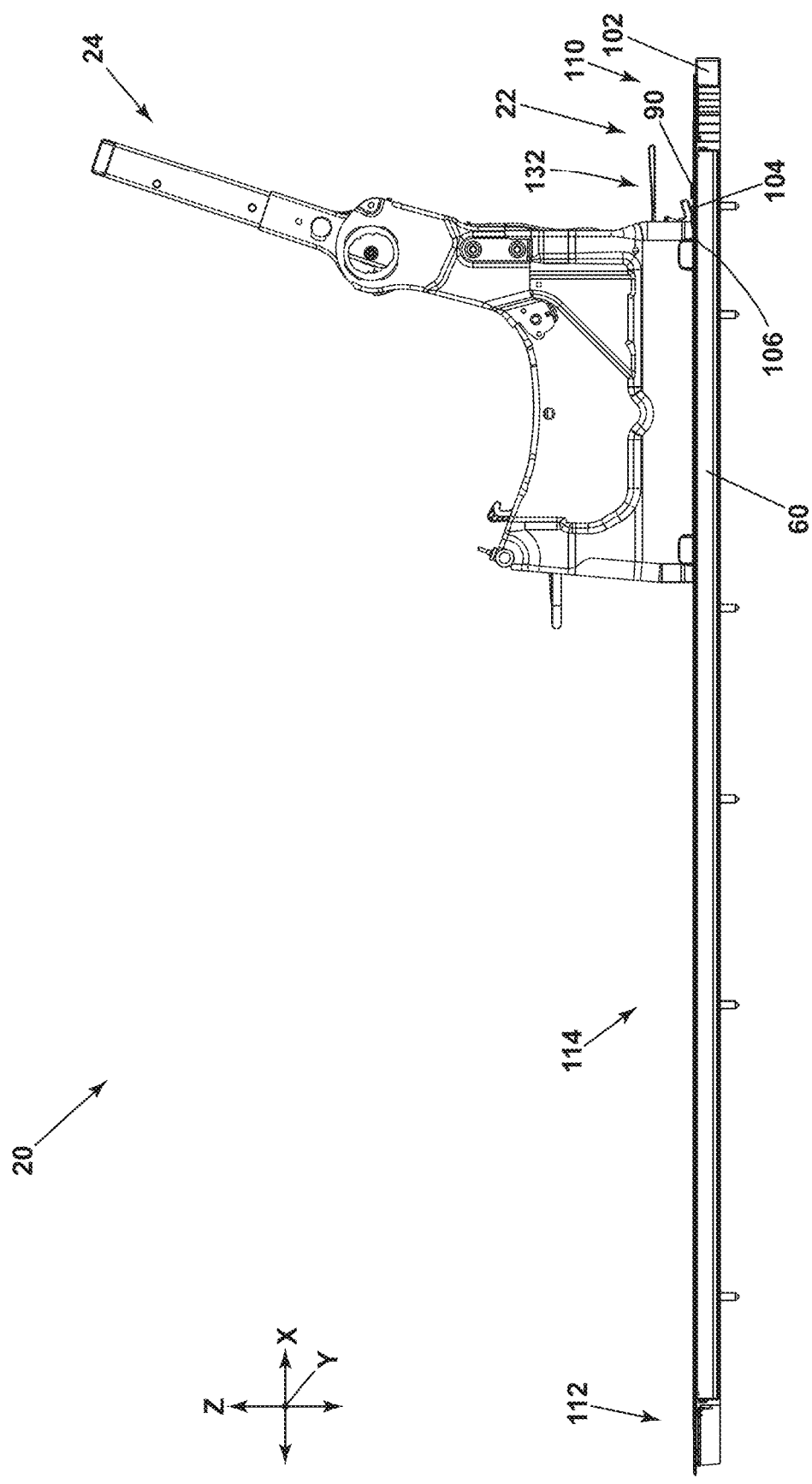
FIG. 9 is a side view generally illustrating an embodiment of a track assembly, with a support assembly electrical connector connecting with a track electrical connector, according to teachings of the present disclosure.

Referring to FIGS. 9-10B, as the support assembly 24 approaches the longitudinal end 110, the latch 130 contacts the ramped surface 106 of the protrusion 104, which starts to rotate the latch 130 upward and over the protrusion 104.

Figure 11:
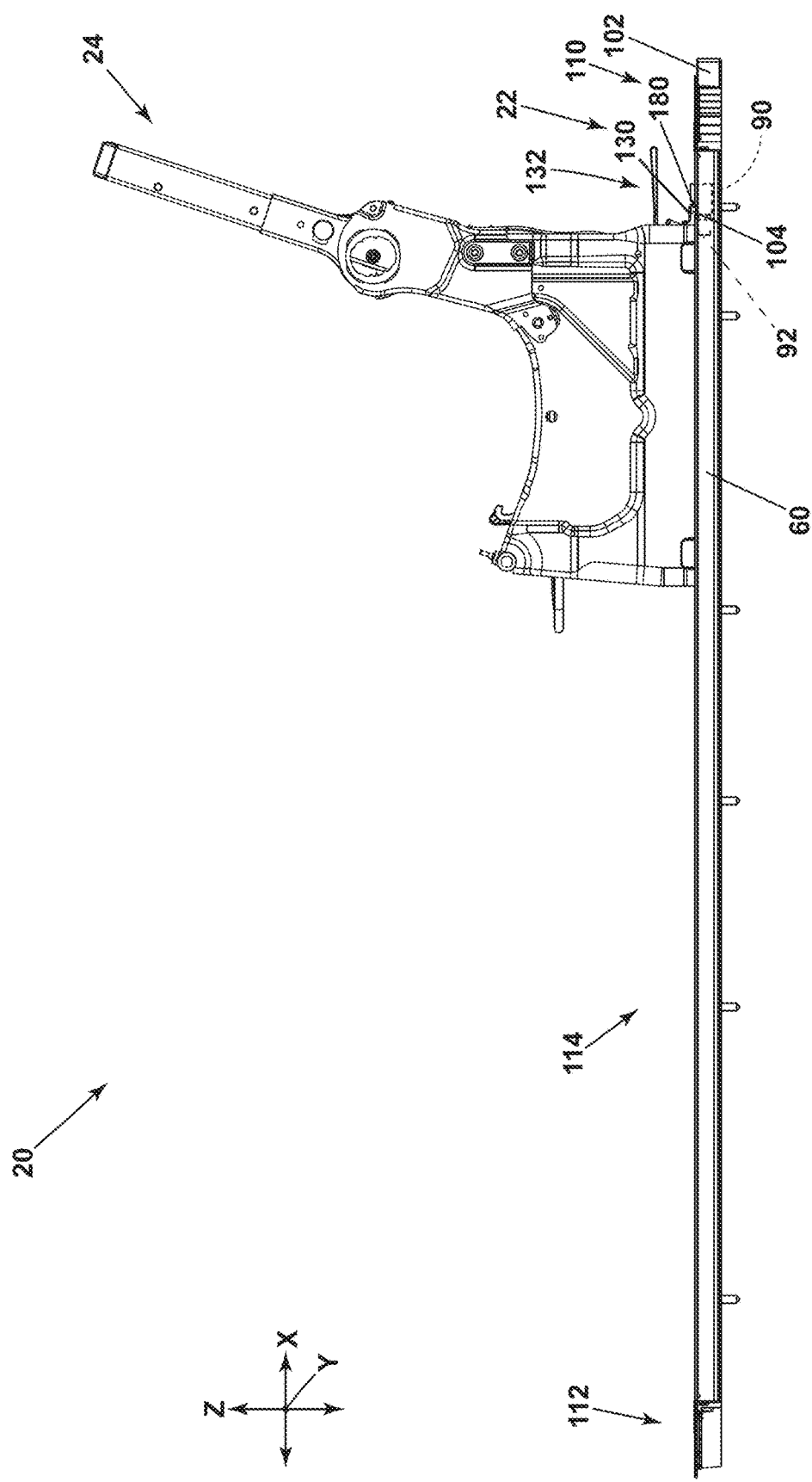
FIG. 11 is a side view generally illustrating an embodiment of a track assembly, with a support assembly electrical connector connected with a track electrical connector, according to teachings of the present disclosure.

Referring FIGS. 11-12B, continued movement of the support assembly 24 toward the longitudinal end 110 fully engages the electrical connectors 90, 92 and moves the receptacle 180 into alignment and engagement with the protrusion 104, which latches/locks the electrical connectors 90, 92 together.

Figure 13:
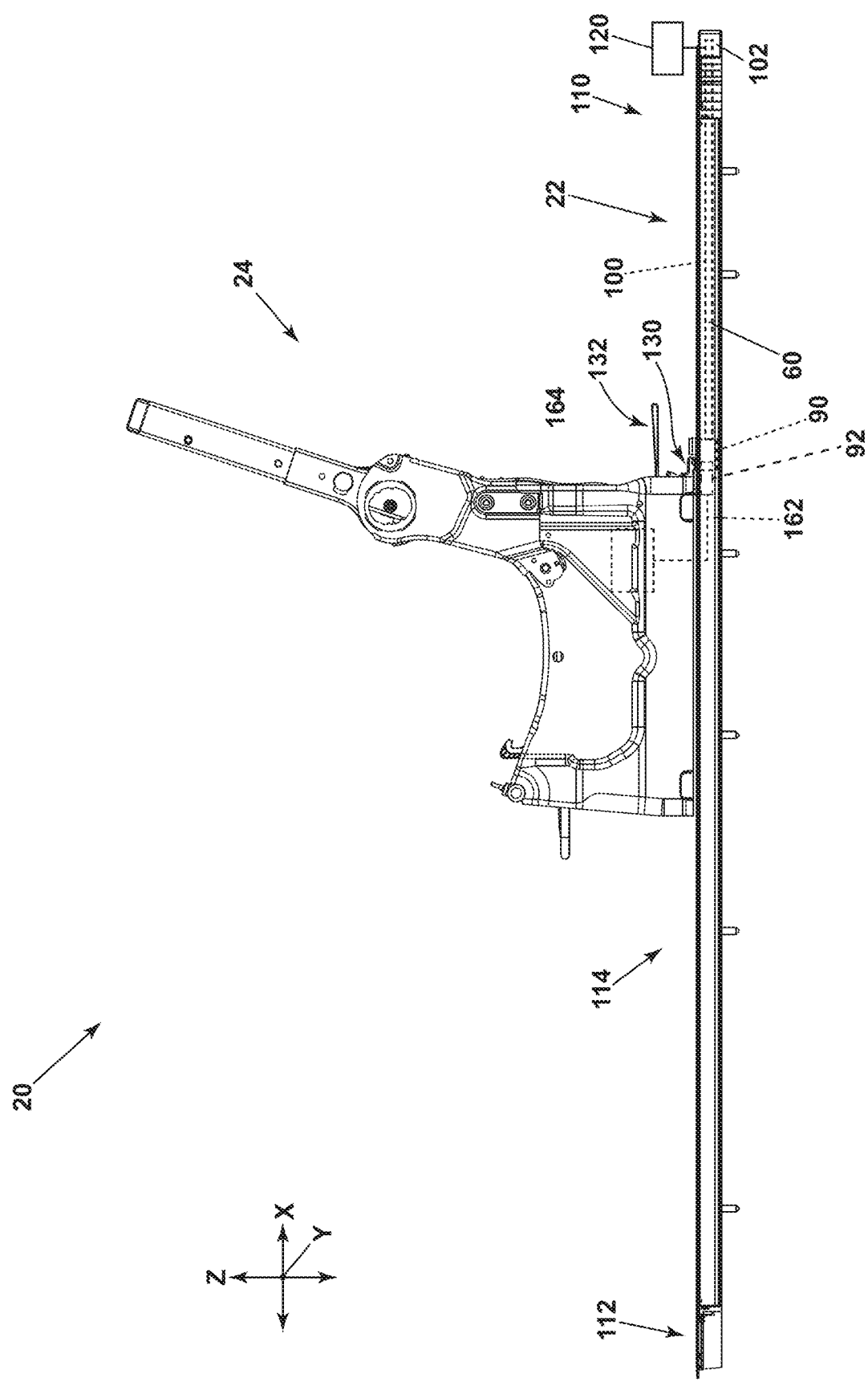
FIG. 13 is a side view generally illustrating an embodiment of a track assembly, with a support assembly electrical connector connected with a track electrical connector, according to teachings of the present disclosure.
Figure 14:
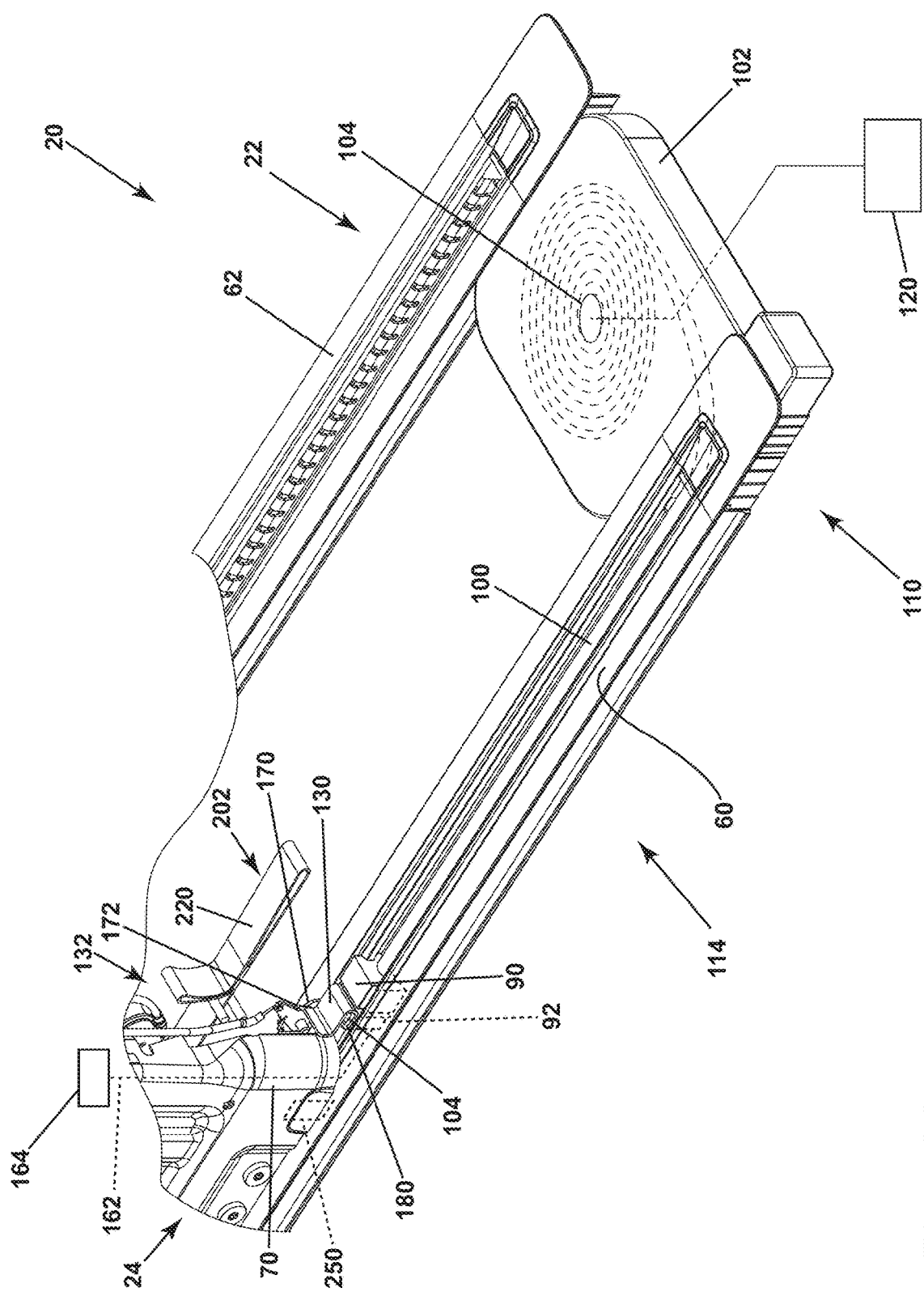
FIG. 14 is a perspective view generally illustrating portions of an embodiment of a track assembly, with a support assembly electrical connector connected with a track electrical connector, according to teachings of the present disclosure.

Referring to FIGS. 13 and 14, with the electrical connectors 90, 92 latched/locked together, the support assembly 24 can move (e.g., slide) along the first track 60 to various positions in the middle section 114. As the support assembly 24 moves, the electrical connectors 90, 92 can remain connected, causing the electrical cable 100 to unwind from the cable winder 102 when the support assembly 24 moves away from the longitudinal end 110 and to wind up in the cable winder 102 when the support assembly 24 moves toward the longitudinal end 110. Electrical power and/or data can be provided via the connectors 90, 92 and the electrical cable 100 to the support assembly 24 (e.g., electrical components 164) from the one or more electrical components 120 and/or from the support assembly 24 to the one or more electrical components 120.

Figure 15:
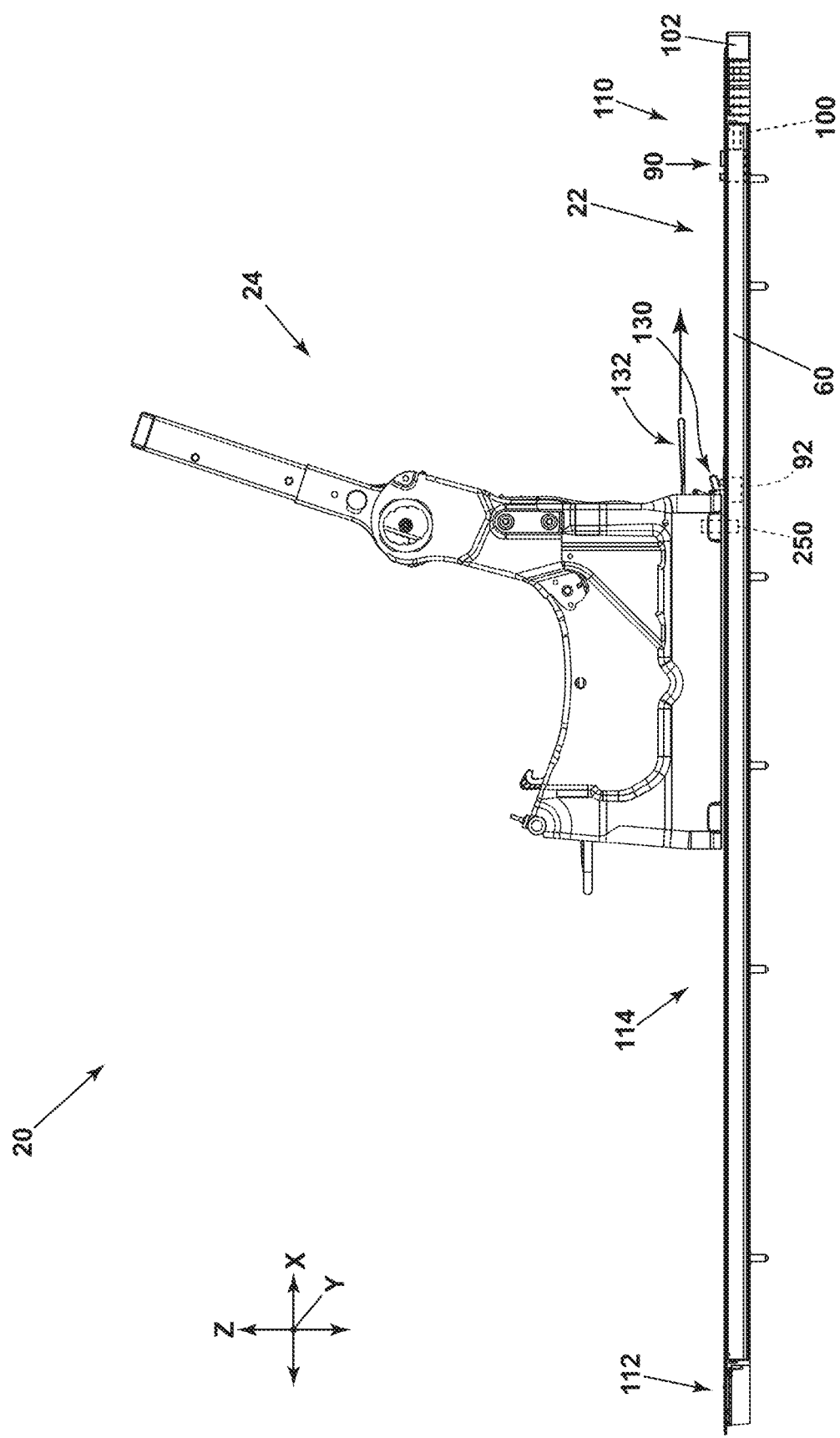
FIG. 15 is a side view generally illustrating an embodiment of a track assembly, with a support assembly electrical connector disconnected from a track electrical connector, according to teachings of the present disclosure.
Figure 16:
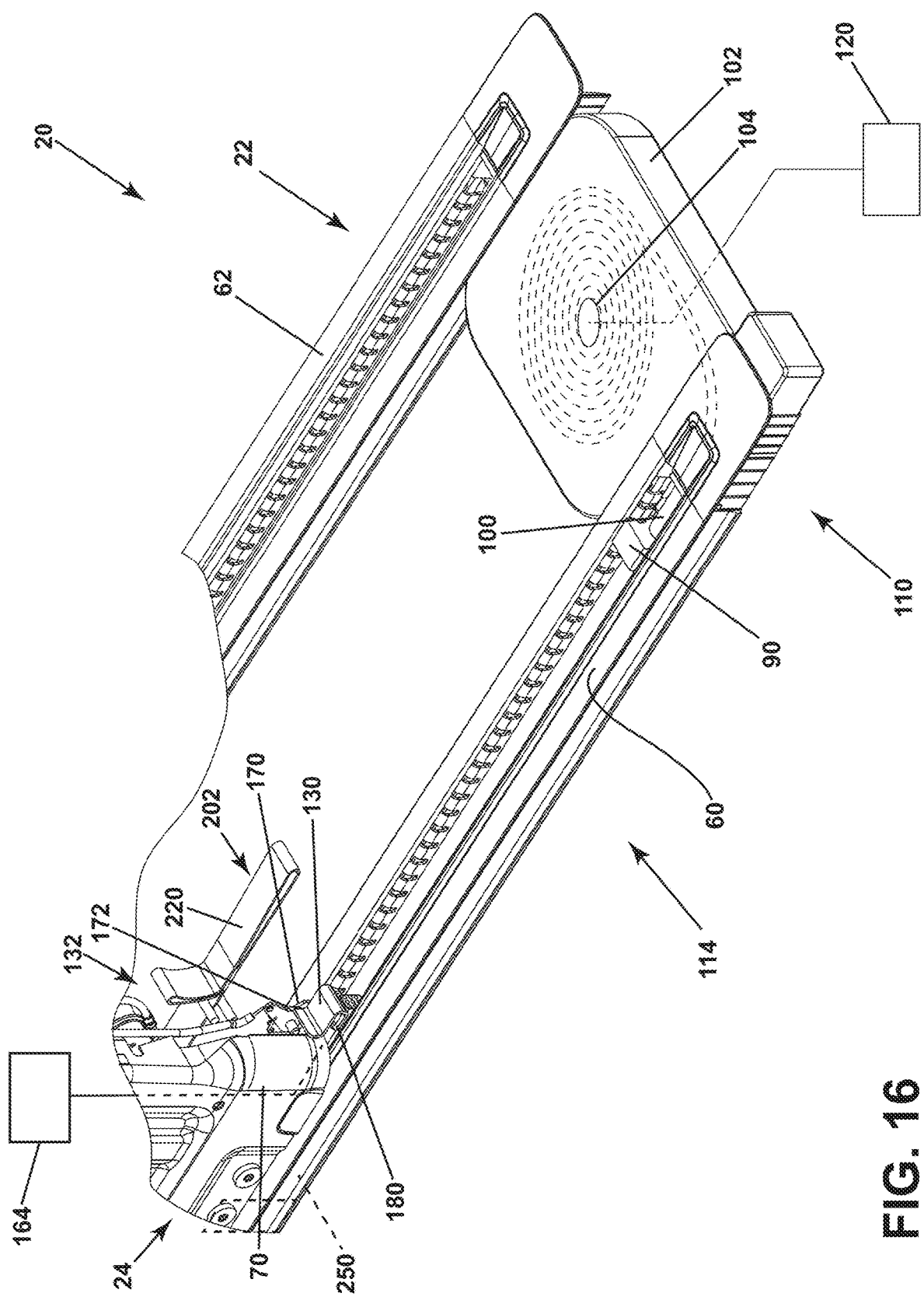
FIG. 16 is a perspective view generally illustrating portions of an embodiment of a track assembly, with a support assembly electrical connector disconnected from a track electrical connector, according to teachings of the present disclosure.

Referring to FIGS. 15 and 16, the support assembly 24 can be removed from the first track 60 after the electrical connectors 90, 92 are connected. For example, operating the actuator 132, such as by pulling the handle 202, disengages the latch 130 from the track electrical connector 90. After the latch 130 is disengaged, a removal force applied by the winder spring 154 to the electrical cable 100, which automatically disengages the track electrical connector 90 from the support assembly electrical connector 92 and returns the track electrical connector 90 to the first longitudinal end 110 (e.g., the track electrical connector 90 moves toward the longitudinal end separately from the support assembly 24). Optionally, operating the actuator 132 also disengages the anchor 250 from the first track 60. In some configurations, the actuator 132 is configured to disengage the latch 130 prior to disengaging the anchor 250, such as to ensure that the electrical connectors 90, 92 are disengaged before permitting removal of the support assembly 24. After the track electrical connector 90 is disengaged from the support assembly electrical connector 92 (e.g., via operating the actuator 132) and the anchor 250 is disengaged from the first track 60, the support assembly 24 can be removed (e.g., vertically) from the first track 60. Once removed, the support assembly 24 can be disposed in a position separate from the pair of tracks 22, such as the position shown in FIG. 7.

Figure 17:
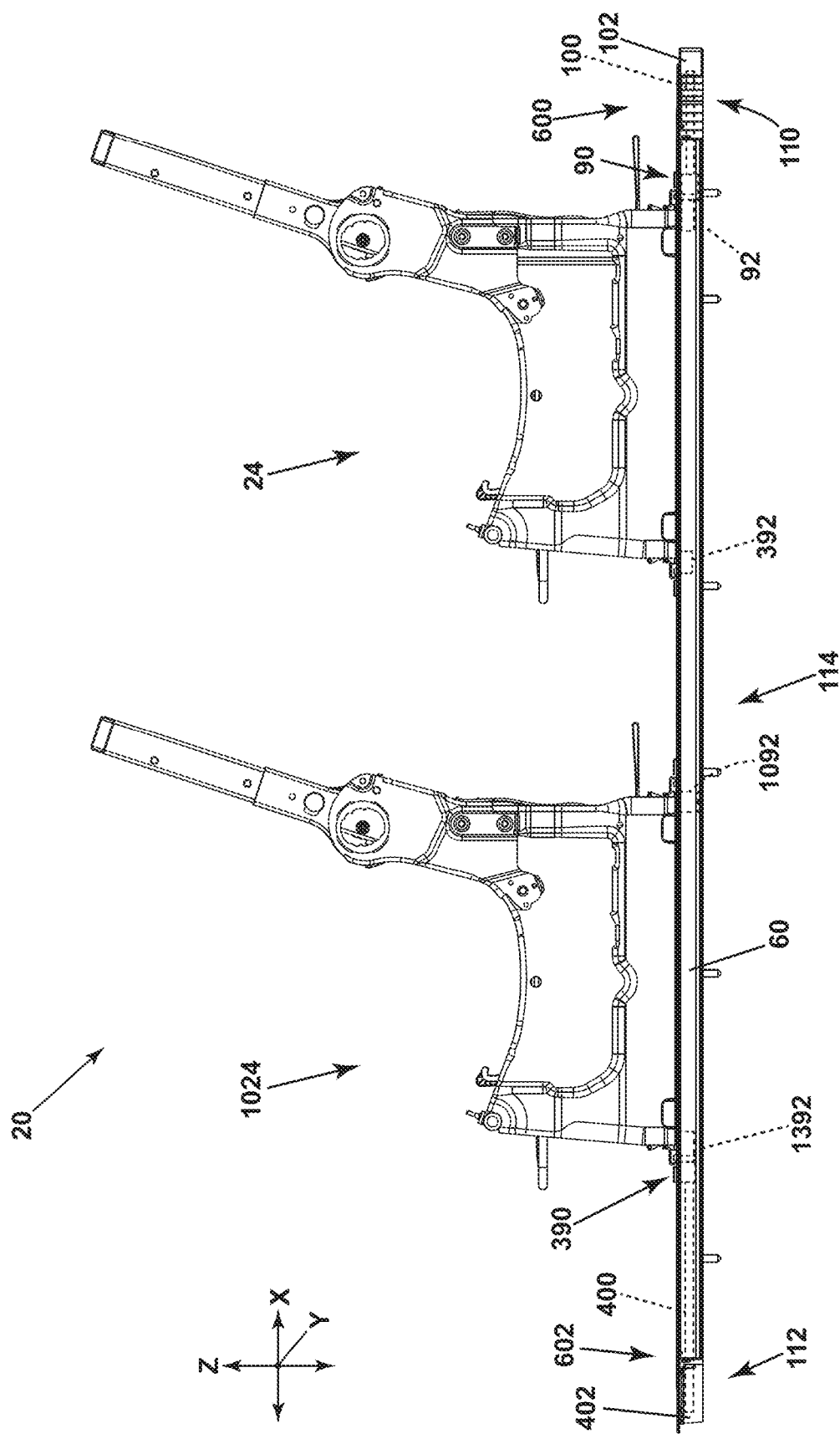
FIG. 17 is a side view generally illustrating an embodiment of a track assembly, including two support assemblies connected to first and second track electrical connectors, respectively, according to teachings of the present disclosure.

Referring to FIG. 17, the track assembly 20 can include a second track electrical connector 390, a second electrical cable 400, and a second cable winder 402, which can be configured in the same or a similar manner as the track electrical connector 90, the electrical cable 100, and the cable winder 102, respectively. The second cable winder 402 is disposed at the second longitudinal end 112 of the first track 60. The second electrical cable 400 is connected to and disposed at least partially in the second cable winder 402. The second track electrical connector 390 is connected to the second electrical cable 100 and disposed at least partially in the first track 60. The support assembly 24 includes a second support assembly electrical connector 392 configured to be disposed at least partially in the first track 60 and for engagement and electrical connection with the second track electrical connector 390. For example, upon insertion into the first track 60, the support assembly 24 can be moved (e.g., rearward) toward the first longitudinal end 110 to engage the support assembly electrical connector 92 with the track electrical connector 90 or can be moved (e.g., forward) toward the second longitudinal end 112 to engage the second support assembly electrical connector 392 with the second track electrical connector 390.

A dual track connector configuration may be desirable at least where multiple support assemblies, such as the support assembly 24 and a second support assembly 1024, can be connected to the same first track 60, and/or where a support assembly 24, 1024 can be connected to the track 60 in two orientations (e.g., forward and rearward). For example, the support assembly 24 can be moved to connect with one of the track electrical connectors 90, 390 or the second support assembly 1024 can be moved to connect with the other of the track electrical connectors 90, 390. The second support assembly 1024 can include a third support assembly electrical connector 1092 and a fourth support assembly electrical connector 1392 that can be configured in the same or a similar manner as the support assembly electrical connectors 92, 392. In a first configuration, the support assembly electrical connector 92 is engaged with the track electrical connector 90, and the fourth support assembly electrical connector 1392 is engaged with the second track electrical connector 390, as shown in FIG. 17. In a second configuration, the second support assembly electrical connector 392 is engaged with the second track electrical connector 390, and the third support assembly electrical connector 1092 is engaged with the track electrical connector 90. In another configuration (e.g., a reverse or rearward configuration), the second support assembly electrical connector 392 is engaged with the track electrical connector 90, and/or the third support assembly electrical connector 1092 is engaged with the second track electrical connector 390.

With some configurations, the track electrical connector 90, the electrical cable 100, and the cable winder 102 at least partially define a first connector dock 600 disposed at the first longitudinal end 110. Additionally or alternatively, the second track electrical connector 90, the second electrical cable 100, and the second cable winder 402 at least partially define a second connector dock 602 disposed at the second longitudinal end 112.

In some configurations, some or all of the components described in connection with the first track 60 and the first base portion 70, including the electrical connectors 90, 390, 92, 392, the electrical cables 100, 400, the cable winders 102, 402, and the actuator 132 can be duplicated for the second base portion 72 and the second track 62.

The instant disclosure includes the following non-limiting embodiments:

1. A track assembly, comprising: a track; a track electrical connector movably connected to the track; and a support assembly slidably connected to the track, the support assembly including: a support assembly electrical connector connectable with the track electrical connector; a latch selectively engageable with the track electrical connector; and an actuator including at least one of a lever, an actuator cable, or a handle, the actuator operably coupled with the latch to selectively disengage the latch from the track electrical connector; wherein the track electrical connector is movable with the support assembly and relative to the support assembly.

2. The track assembly of any preceding embodiment, wherein the track electrical connector is biased toward a longitudinal end of the track.

3. The track assembly of any preceding embodiment, wherein the track electrical connector is coupled with a cable disposed at least partially in a cable winder that biases the track electrical connector toward the longitudinal end of the track.

4. The track assembly of any preceding embodiment, wherein the track electrical connector includes a ramped surface configured to contact the latch and facilitate engagement of the latch with the track electrical connector.

5. The track assembly of any preceding embodiment, wherein the support assembly is vertically removable from the track.

6. The track assembly of any preceding embodiment, wherein the support assembly includes an anchor that selectively engages the track to restrict vertical removal of the support assembly from the track.

7. The track assembly of any preceding embodiment, wherein the actuator is operably coupled with the anchor such that operation of the actuator moves the anchor to a removal position and disengages the latch from the track electrical connector.

8. The track assembly of any preceding embodiment, wherein the track electrical connector is configured to receive a portion of the support assembly electrical connector.

9. The track assembly of any preceding embodiment, wherein at least a portion of the track electrical connector is configured to slide within the track.

10. The track assembly of any preceding embodiment, comprising a cable winder connected to the track and a n electrical cable disposed partially in the cable winder; and wherein the track electrical connector is connected to the electrical cable.

11. The track assembly of any preceding embodiment, wherein the cable winder is connected to a longitudinal end of the track and biases the track electrical connector toward the longitudinal end of the track such that when the latch is disengaged from the track electrical connector, the track electrical connector automatically returns to the longitudinal end of the track.

12. The track assembly of any preceding embodiment, wherein the support assembly includes a spring biasing the latch toward an engaged position.

13. The track assembly of any preceding embodiment, wherein the latch or the track electrical connector includes a protrusion and the other of the latch or the track electrical connector includes a receptacle configured to at least partially receive the protrusion to lock the track electrical connector with the support assembly electrical connector.

14. The track assembly of any preceding embodiment, further comprising a second track electrical connector; wherein: the track includes a first connector dock disposed at a first end of the track and a second connector dock disposed at a second end of the track; the track electrical connector is biased toward the first end; the second track electrical connector is biased toward the second end; and the support assembly includes a second support assembly electrical connector engageable with the second track electrical connector.

15. The track assembly of any preceding embodiment, wherein the first connector dock includes a first cable winder and the second connector dock includes a second cable winder.

16. The track assembly of any preceding embodiment, further comprising a second support assembly including: a third support assembly electrical connector engageable with the track electrical connector; and a fourth support assembly electrical connector engageable with the second track electrical connector.

17. The track assembly of any preceding embodiment, wherein, in a first configuration, the support assembly electrical connector is engaged with the track electrical connector, and the fourth support assembly electrical connector is engaged with the second track electrical connector; and in a second configuration, the second support assembly electrical connector is engaged with the second track electrical connector, and the third support assembly electrical connector is engaged with the track electrical connector.

18. A method of operating the track assembly of any preceding embodiment, the method comprising: inserting a portion of the support assembly into the track; sliding the support assembly along the track toward a longitudinal end of the track to engage the support assembly electrical connector with the track electrical connector; sliding the support assembly with the track electrical connector away from the longitudinal end of the track; operating the actuator to disengage the latch from the track electrical connector; and moving the track electrical connector toward the longitudinal end separately from the support assembly.

19. The method of any preceding embodiment, further comprising vertically removing the support assembly from the track after operating the actuator.

20. The method of any preceding embodiment, wherein: the track electrical connector is connected to an electrical cable disposed at least partially in a winder; sliding the support assembly with the track electrical connector includes unwinding the electrical cable from the winder; and the winder automatically moves the track electrical connector toward the longitudinal end after the actuator is operated to disengage the latch.

21. The track assembly of any preceding embodiment, wherein the support assembly comprises a vehicle seat.

22. The track assembly of any preceding embodiment, wherein the support assembly is vertically removable from the track.

23. The track assembly of any preceding embodiment, wherein the track is at least two meters long.

24. A vehicle including the track assembly of any preceding embodiment.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in some examples," "with some examples," "various embodiments," "with some embodiments," "in some embodiments," "an embodiment," "with some configurations," "in some configurations," or the like, means that a particular feature, structure, or characteristic described in connection with the example/embodiment/configuration is included in at least one embodiment. Thus, appearances of the phrases "examples, "in some examples," "with some examples," "in various embodiments," "with some embodiments," "in some embodiments," "an embodiment," "with some configurations," "in some configurations," or the like, in places throughout the specification are not necessarily all referring to the same embodiment. Furthermore, the particular features, structures, and/or characteristics may be combined in any suitable manner in one or more examples/embodiments. Thus, the particular features, structures, or characteristics illustrated or described in connection with one embodiment/example/configuration may be combined, in whole or in part, with the features, structures, functions, and/or characteristics of one or more other embodiments/examples/configurations without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element, unless the context clearly indicates otherwise. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both elements, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. Uses of "and" and "or" are to be construed broadly (e.g., to be treated as "and/or"). For example and without limitation, uses of "and" do not necessarily require all elements or features listed, and uses of "or" are inclusive unless such a construction would be illogical. It will be further understood that the terms "includes," "including," "comprises," and/or "comprising," when used in this application, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. A track assembly, comprising:
    a track;
    a track electrical connector movably connected to the track; and
    a support assembly slidably connected to the track, the support assembly including:
        a support assembly electrical connector connectable with the track electrical connector;
        a latch selectively engageable with the track electrical connector; and
        an actuator including at least one of a lever, an actuator cable, or a handle, the actuator operably coupled with the latch to selectively disengage the latch from the track electrical connector;
    wherein the track electrical connector is movable with the support assembly and relative to the support assembly.

2. The track assembly of claim 1, wherein the track electrical connector is biased toward a longitudinal end of the track.

3. The track assembly of claim 2, wherein the track electrical connector is coupled with a cable disposed at least partially in a cable winder that biases the track electrical connector toward the longitudinal end of the track.

4. The track assembly of claim 1, wherein the track electrical connector includes a ramped surface configured to contact the latch and facilitate engagement of the latch with the track electrical connector.

5. The track assembly of claim 1, wherein the support assembly is vertically removable from the track.

6. The track assembly of claim 5, wherein the support assembly includes an anchor that selectively engages the track to restrict vertical removal of the support assembly from the track.

7. The track assembly of claim 6, wherein the actuator is operably coupled with the anchor such that operation of the actuator moves the anchor to a removal position and disengages the latch from the track electrical connector.

8. The track assembly of claim 1, wherein the track electrical connector is configured to receive a portion of the support assembly electrical connector.

9. The track assembly of claim 1, wherein at least a portion of the track electrical connector is configured to slide within the track.

10. The track assembly of claim 1, comprising a cable winder connected to the track and an electrical cable disposed partially in the cable winder; and
    wherein the track electrical connector is connected to the electrical cable.

11. The track assembly of claim 10, wherein the cable winder is connected to a longitudinal end of the track and biases the track electrical connector toward the longitudinal end of the track such that when the latch is disengaged from the track electrical connector, the track electrical connector automatically returns to the longitudinal end of the track.

12. The track assembly of claim 1, wherein the support assembly includes a spring biasing the latch toward an engaged position.

13. The track assembly of claim 1, wherein the latch or the track electrical connector includes a protrusion and the other of the latch or the track electrical connector includes a receptacle configured to at least partially receive the protrusion to lock the track electrical connector with the support assembly electrical connector.

14. The track assembly of claim 1, further comprising a second track electrical connector;
    wherein:
        the track includes a first connector dock disposed at a first end of the track and a second connector dock disposed at a second end of the track;
        the track electrical connector is biased toward the first end;
        the second track electrical connector is biased toward the second end; and
        the support assembly includes a second support assembly electrical connector engageable with the second track electrical connector.

15. The track assembly of claim 14, wherein the first connector dock includes a first cable winder and the second connector dock includes a second cable winder.

16. The track assembly of claim 14, further comprising a second support assembly including:
    a third support assembly electrical connector engageable with the track electrical connector; and
    a fourth support assembly electrical connector engageable with the second track electrical connector.

17. The track assembly of claim 16, wherein, in a first configuration, the support assembly electrical connector is engaged with the track electrical connector, and the fourth support assembly electrical connector is engaged with the second track electrical connector; and
    in a second configuration, the second support assembly electrical connector is engaged with the second track electrical connector, and the third support assembly electrical connector is engaged with the track electrical connector.

18. A method of operating the track assembly of claim 1, the method comprising:
   inserting a portion of the support assembly into the track;
   sliding the support assembly along the track toward a longitudinal end of the track to engage the support assembly electrical connector with the track electrical connector;
   sliding the support assembly with the track electrical connector away from the longitudinal end of the track;
   operating the actuator to disengage the latch from the track electrical connector; and
   moving the track electrical connector toward the longitudinal end separately from the support assembly.

19. The method of claim 18, further comprising vertically removing the support assembly from the track after operating the actuator.

20. The method of claim 18, wherein:
   the track electrical connector is connected to an electrical cable disposed at least partially in a winder;
   sliding the support assembly with the track electrical connector includes unwinding the electrical cable from the winder; and
   the winder automatically moves the track electrical connector toward the longitudinal end after the actuator is operated to disengage the latch.

* * * * *